(12) United States Patent  (10) Patent No.: US 8,887,221 B2
Omernick  (45) Date of Patent: Nov. 11, 2014

(54) SYSTEMS AND METHODS FOR SERVER-SIDE FILTERING

(75) Inventor: Timothy P. Omernick, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1561 days.

(21) Appl. No.: 12/135,051

(22) Filed: Jun. 6, 2008

(65) Prior Publication Data

US 2008/0307477 A1    Dec. 11, 2008

Related U.S. Application Data

(60) Provisional application No. 60/934,108, filed on Jun. 9, 2007.

(51) Int. Cl.
*H04N 7/16* (2011.01)
*H04N 7/173* (2011.01)
*H04N 21/20* (2011.01)
*H04N 21/658* (2011.01)
*H04N 21/2343* (2011.01)
*H04N 21/239* (2011.01)
*H04N 21/61* (2011.01)

(52) U.S. Cl.
CPC ....... *H04N 7/17318* (2013.01); *H04N 21/6581* (2013.01); *H04N 21/23439* (2013.01); *H04N 21/2393* (2013.01); *H04N 21/6175* (2013.01)

USPC .............................. 725/109; 725/62; 725/86

(58) Field of Classification Search
CPC .................. H04N 21/41407; H04N 21/47202; H04H 60/78
USPC ............. 725/105, 109, 110, 114–116, 62, 86, 725/100; 709/201, 203, 217, 219, 246, 200
See application file for complete search history.

(56) References Cited

U.S. PATENT DOCUMENTS

2005/0138137 A1 *  6/2005  Encarnacion et al. ......... 709/217
2007/0113246 A1 *  5/2007  Xiong ............................. 725/39

* cited by examiner

*Primary Examiner* — Benjamin R Bruckart
*Assistant Examiner* — Jason Thomas
(74) *Attorney, Agent, or Firm* — Park, Vaughan, Fleming & Dowler LLP

(57) ABSTRACT

Some embodiments of the invention are directed to, among other things, systems, computer readable media, methods and any other means for requesting information from a server. In some embodiments, a client generates a URL request that is provided to the server. The URL request includes a format identifier that is specific to the server's type. The format identifier is also associated with the data format of a video stored on the server that the user is interested in. The server may then provide data that is associated with the format identifier.

10 Claims, 3 Drawing Sheets

US 8,887,221 B2

SYSTEMS AND METHODS FOR SERVER-SIDE FILTERING

FIELD OF THE INVENTION

The present invention relates generally to filtering data with a server. More specifically, the invention allows one or more servers to filter data based on a format identifier that can be included in a client's request to the one or more servers.

BACKGROUND OF THE INVENTION

Portable and handheld electrical devices are a staple of modern society. Every day, millions of people use laptop computers, cellular telephones, digital music players and personal data assistants (PDAs). As technology and innovation progress, electrical devices become more portable and processors become faster. As a result, devices have an increasing number of features and more complex menu systems, despite getting smaller, even handheld.

One handheld device was recently lauded as being revolutionary for successfully combining, among other things, a cellular phone, wireless internet connectivity, a media player, and a touch screen. That device is Apple Inc.'s iPhone™. (Apple Inc. owns the iPhone™ trademark.) Although many of the features had been previously integrated in its larger brethren (some of which were portable but not handheld), the iPhone™ device was lauded as revolutionary, largely because Apple Inc. figured out how to integrate those features (in addition to others) in a handheld device.

Handheld devices can utilize a number of different means for receiving user inputs. For example, the iPhone™ includes a multi-touch display screen. Most other cellular telephones include a QWERTY keypad and/or number pad. Some devices, like BlackBerrys™, also include a scroll wheel and/or scroll ball. (BlackBerry™ is a service mark owned by Research In Motion Limited Corporation.) As yet another example, iPods™ include click wheels. (iPod™ is a trademark owned by Apple Inc.)

All of these components receive some sort of touch-based, physical stimulus that is converted to electrical data signals. The data signals can be used to control the functionality of the electrical device. For example, the data signals can cause the electrical device to make a telephone call, present an informational or media display, take a picture, and/or perform any other function that the device is configured to allow a user to control. A user can even use a the touch screen display to navigate among and select options associated with information and media available on the Internet. In response to the user selecting an option, the device can send a request to the server, which can return data that is processed by the handheld device into displayable information.

Prior to the invention, obtaining some information and media from the Internet was too expensive (with regards to bandwidth and battery requirements) and limited some devices as to the types of media and information the devices could present for the user. For example, YouTube™ videos could not be viewed by all handheld devices (even those with web browsers). (YouTube™ is a trademark owned by Google Inc.)

SUMMARY OF THE INVENTION

The present invention relates generally to filtering data with a server. More specifically, the present invention allows a network (or any other) server to filter data based on a format qualifier included in a client request.

For example, the present invention includes systems and methods of requesting information from a server in response to, e.g., receiving a user input indicating a desire to view a video (or any other type of media and/or information) that is formatted in a particular manner. The video can be stored on a server.

In response to receiving the user input, the media device (which can also be a client device in a client/server network) can determine a type of server that stores the video. The type of the server can be used to generate a request (such as, e.g., a URL) that includes an embedded format identifier. The format identifier can be specific to the type of server and can be associated with the particular type of data format that the device can (or prefers to) receive and playback to a user.

The media device can provide the request to the server. The server can then query the request and provide data (e.g., metadata and/or media data) to the media device. The data the client device receives from the server can be associated with the format identifier embedded in the request. The client device can then, for example, process the data, generate information based on the data and display the information on an integrated display, television, etc. The information can be listings information (e.g., text) associated with at least one video that is stored on the server and is encoded in accordance with the data format. The information can also include or be one or more images, video, any other type of display component and/or any combination thereof. For example, the data can be streaming video data and the media device can present the video to a user in real or near-real time (e.g., as it is downloaded from the server(s)). The server(s) can be, for example, one or more YouTube™ servers that provide user generated content, a .MAC server, any other server, and/or any combination thereof. The data format can be H.264 video format.

BRIEF DESCRIPTION OF THE DRAWINGS

The above and other features of the present invention, its nature and various advantages will be more apparent upon consideration of the following detailed description of the disclosure, taken in conjunction with the accompanying drawings, in which like reference numerals refer to like parts throughout, and in which.

DETAILED DESCRIPTION OF THE DISCLOSURE

The present invention can include systems, apparatuses, methods, computer readable media and any other means for requesting information from a server.

Figure 1:
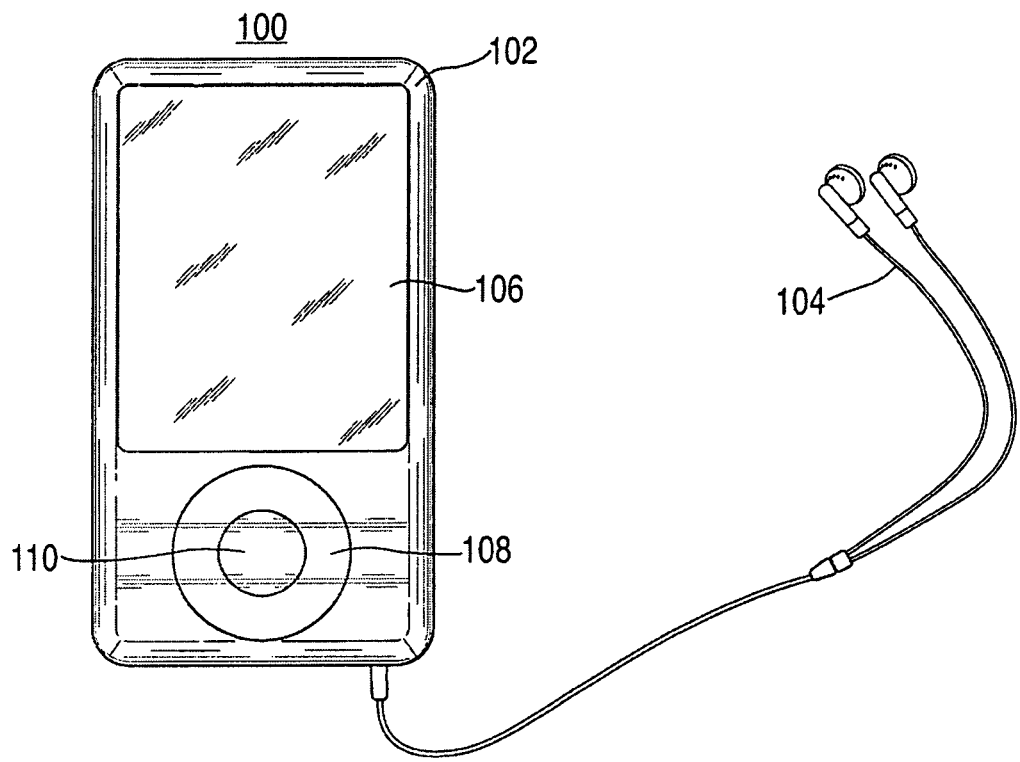
FIGS. 1-2 show exemplary systems in accordance with some embodiments of the present invention.

FIG. 1 shows system 100, which can be operated in accordance with some embodiments of the present invention. System 100 includes handheld device 102 and accessory device 104.

Handheld device 102 can be used to play media (e.g., music, images, video, etc.), generate media (e.g., take pictures, record audio and/or video, etc.), access the Internet, take notes, organize appointments, and/or perform any other function. One or more additional accessory devices, such as headphones 104, can also be included in system 100. Handheld device 102 is illustrated as an iPod™, but one skilled in the art would appreciate that handheld device 102 could be any type of electrical device.

Handheld device 102 includes display component 106. As shown in FIG. 1, display component 106 can be a display screen that is integrated into handheld device 102. Display component 106, like any other component discussed herein, does not have to be integrated into handheld device 102 and can be external to handheld device 102. For example, display component 106 can be a computer monitor, television screen, and/or any other graphical user interface, textual user interface, or combination thereof.

Display component 106 enables handheld device 102 to present displays to a user. The displays can include various types of information and selectable options. For example, a display can include media or information about media that is being played back or can be played back. The displays can also include information downloaded from the Internet (and in some instances, after device 102 has been verified by the server providing the information), contact information, map information or any other type of information. The information can be interactive and responsive to user inputs. In addition, the displays presented by display component 106 can include selectable options that allow a user to navigate the menu hierarchy and utilize the features implemented by handheld device 102.

User input component 108 is illustrated in FIG. 1 as a click wheel. User input component 108 (in combination with its driver circuitry, discussed below) can be used to convert one or more touch inputs into electrical signals, which can cause handheld device 102 to generate and execute one or more executable commands. The center portion of input component 108 can be button 110. Button 110 can be pressure sensitive, touch sensitive, a proximity sensor, any other type of button or input component, or any combination there of. For example, user input component 108 can be used to control handheld device 102, interact with the menu hierarchy implemented on handheld device 102, select media for downloading and/or instruct handheld device 102 to perform any function it is configured to perform.

One skilled in the art would appreciate that user input component 108 could be any type of user input device that receives a user input and, in response, facilitates the creation of one or more corresponding electrical signals. One skilled in the art would also appreciate that user input component 108 can be integrated into or located external to handheld device 102. For example, user input component 108 could also be, or include, at least one mouse, keyboard, trackball, slider bar, switch, button (such as button 110), number pad, dial, or any combination thereof.

Another example of a user interface component is a multi-touch display screen such as that discussed below in connection with, e.g., FIG. 2 and described in commonly assigned Westerman et al., U.S. Pat. No. 6,323,846, issued Nov. 27, 2001, entitled "Method and Apparatus for Integrating Manual Input," which is incorporated by reference herein in its entirety. User input component 108 may emulate a rotary phone or a multi-button electrical device pad, which may be implemented on a touch screen or the combination of a click wheel or other user input device and a screen. A more detailed discussion of such a rotary phone interface may be found, for example, in McKillop et al., U.S. patent application Ser. No. 11/591,752, filed Nov. 1, 2006, entitled "Touch Pad with Symbols based on Mode," which is incorporated by reference herein in its entirety.

In other embodiments, one or more additional accessory devices can be used with handheld device 102. For example, in addition to or instead of accessory device 104, a wireless headset or Apple TV can also be wirelessly coupled to handheld device 102. Handheld device 102 and one or more accessory devices could exchange information using any protocol (such as, e.g., a 802.11 protocol and/or BlueTooth™) If using BlueTooth™, the devices could pair together automatically. Automatic BlueTooth™ pairing is discussed in more detail in commonly assigned Tang et al., U.S. patent application Ser. No. 11/823,923, filed Jun. 28, 2007, entitled "Apparatuses and Methods that Facilitate the Transfer of Power and Information Among Electrical Devices," which is incorporated by reference herein in its entirety.

Accessory device 104 can operate automatically after successfully executing the proper handshaking protocols, in response to it being coupled to handheld device 102 or in response to one or more user input(s). For example, accessory device 104 may not have its own power supply or input components and only function when it is coupled to handheld device 102. As another example, specialized circuitry or applications (for example, an online video playback feature) can be included in an accessory device (such as an Apple TV) and not in handheld device 102. One skilled in the art would also appreciate that handheld device 102 can be any electrical device, even devices that are not handheld (e.g., laptop computer) or portable (e.g., desktop computer, television, wireless router, etc.).

Figure 2:
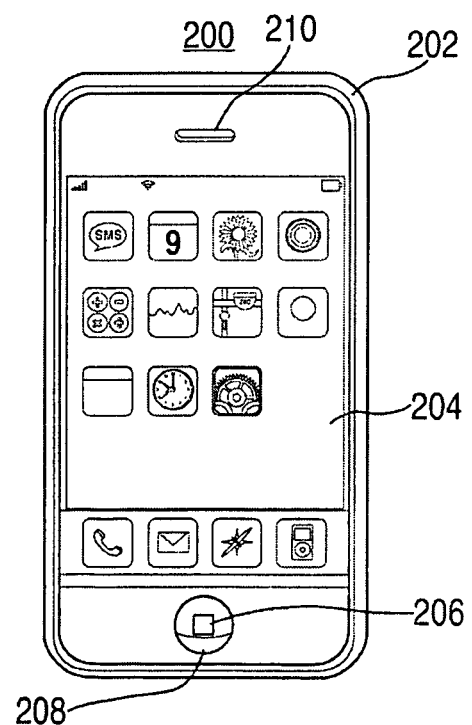

FIG. 2 shows computer system 200 which can also be used in accordance with some embodiments of the present invention. Computer system 200 includes electrical device 202, which is shown in FIG. 2 as an iPhone™ As such, electrical device 202 can function as, among other things, a portable media player, cellular telephone, personal organizer, web browser, camera, and GPS device. One skilled in the art would appreciate that electrical device 202 can be any type of electrical device and be coupled to and used with any type of accessory device without departing from the spirit of the invention.

Electrical device 202 comprises user interface component 204. User interface component 204 is shown in FIG. 2 as a multi-touch screen that can function as both an integrated display screen (the same as or similar to display 106 described above) and an input device that can receive touch events. Multi-touch display screens are discussed in more detail in commonly assigned U.S. Patent Publication No. U.S. 2006 0097991, entitled "MULTIPOINT TOUCHSCREEN," which is incorporated herein by reference in its entirely. Electrical device 202 can also include one or more other user interface components, such as button 206, which can be used to supplement user interface component 204.

Microphone 208 and audio output 210 are respective examples of other input and output components that can be integrated into electrical device 202 or any other device discussed herein. Microphone 208 is preferably a transducer that can capture analog audio signals and convert them into digital signals.

Audio output 210 is shown as being a speaker integrated into electrical device 202, but one skilled in the art would appreciate that audio output 210 may also comprise an external device (such as headphones not shown) and/or one or more connector(s) used to facilitate the playing back of audio content and/or the audio portion of video content.

Figure 3:
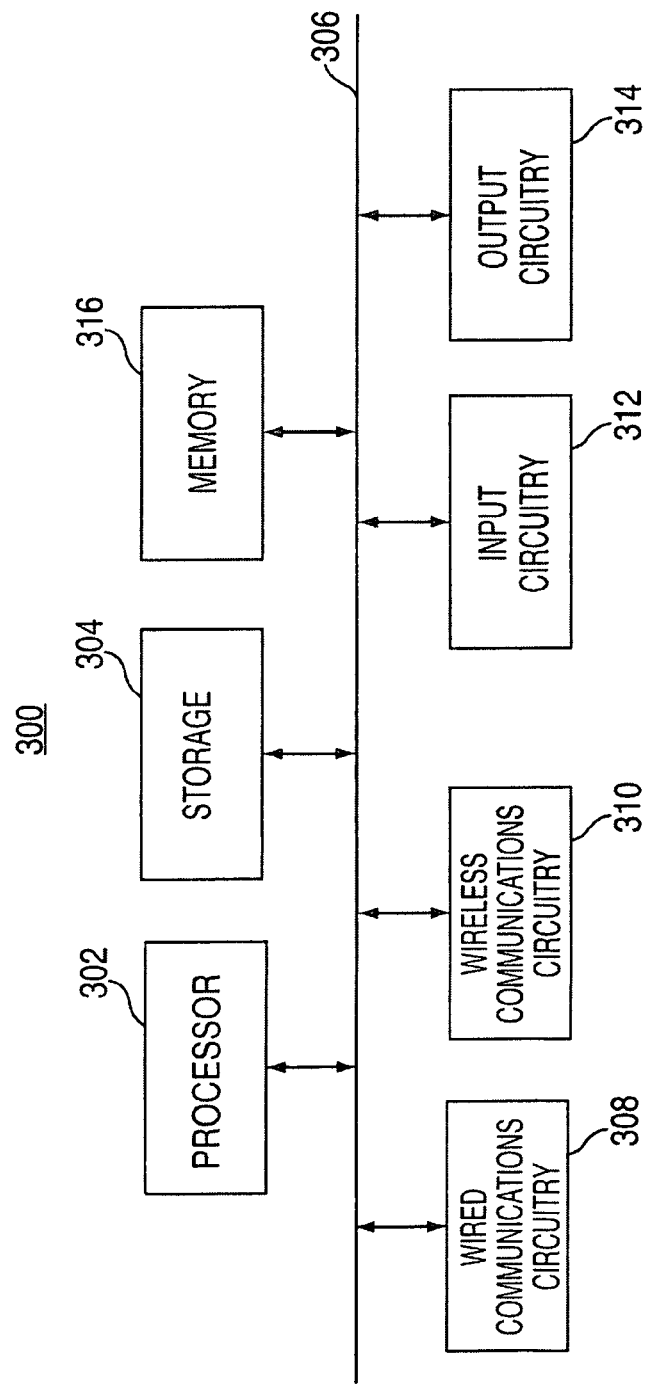
FIG. 3 shows a simplified schematic block diagram of exemplary circuitry incorporated in an apparatus that is in accordance with some embodiments of the present invention.

FIG. 3 shows a simplified schematic diagram of an exemplary electrical device or devices in accordance with some embodiments of the present invention. Apparatus 300 can be implemented in or as any type of electrical device or devices, such as, for example, handheld device 102 and/or electrical device 202 discussed above. In some embodiments, the circuitry of apparatus 300 could be implemented, for example, using a multi-chip module including two or more separate integrated circuits.

Apparatus 300 can be configured to request, receive, store and/or present one or more types of data (e.g., text, video, audio, image, etc.) to a user and/or other device. Data that represents video, images, and/or audio is sometimes referred to herein as media. Additional data, such as descriptive text data associated with media is sometimes referred to herein as metadata. Apparatus 300 can be integrated into or can be any type of portable, fixed, and/or mobile device, including but not limited to a laptop computer, a desktop computer, an audio player (e.g., walkman, compact disc player, etc.), a video player, a media player (e.g., an iPod™ sold by Apple Inc. of Cupertino, Calif., etc.), a television set top box (such as, e.g., an Apple TV™), a portable video game system (e.g., Sony's PSP, Nintendo's Game Boy, etc.), an electronic book, a cellular telephone, a wireless telephone, a hand held computer, a GPS device, a flashlight, a personal digital assistant (PDA) (e.g., Palm Pilot, etc.), a wireless headset for a telephone, a satellite radio, a remote control, an automobile key fob, a printer, an automobile radio, an automobile computing system, a watch, a surge protector, an AC/DC converter, etc., or any combination thereof (such as Apple's iPhone™).

Apparatus 300 can include (but is not limited to) one or more of the following components: processor 302, storage 304, bus 306, wired communications circuitry 308, wireless communications circuitry 310, input circuitry 312, output circuitry 314 and memory 316. One skilled in the art would appreciate that apparatus 300 can also include additional components that are not shown in FIG. 3 (such as, e.g., at least one user input interface, etc.), that the components shown in FIG. 3 could be combined with one another and/or with components that are not shown in FIG. 3, and that the components shown in FIG. 3 can represent one or more components (e.g., wireless communications circuitry 310 can represent the components necessary for WiFi, Bluetooth, and/or cellular telephone communications).

Processor 302 can be configured to control the operation of apparatus 300. For example, processor 302 can control wired communications circuitry 308 and/or wireless communications circuitry 310, thereby enabling apparatus 300 to communicate with one or more other devices (such as, e.g., data servers). These communications can be used to, for example, verify the authenticity of apparatus 300 to one or more servers, verify the authenticity of one or more other devices, receive a direct input (from, e.g., a USB drive) using input circuitry 312, request and receive media from one or more servers, and/or provide data to a display device using output circuitry 314. Processor 302 can, for example, stream data directly from an interface component (e.g., wired communications circuitry 308, wireless communications circuitry 310, input circuitry 312, etc.) to output circuitry 314 and/or store data in storage 304 and/or memory 316.

Storage 304 can be configured to store data, including media, configuration data for apparatus 300, metadata, operating instructions, etc. Storage 304 can be any type of non-volatile storage, including a hard disk device, flash memory, a solid-state drive, etc. For example, media or any other data received from a remote server can be stored on storage 304. The data can then be locally accessed and processed by, e.g., processor 302. Further, configuration information, such as the resolution of a coupled display device or information identifying an associated media server, can be stored on storage 304. Additionally, storage 304 can include operating instructions executed by processor 302 for controlling operation of the media processing device 100. For example, storage 304 can be divided into a plurality of partitions, wherein each partition can be utilized to store one or more types of information and can have custom access control provisions.

Bus 306 couples the components of apparatus 300 together. Bus 306 can be configured to permit unidirectional and/or bidirectional communications between the components of apparatus 300. For example, processor 302 can retrieve information from and transmit information to storage 304 over bus 306. Bus 306 can include, for example, a plurality of buses, each of which couples at least one component of apparatus 300 to another component of apparatus 300 or to a device external to apparatus 300.

The input, output and communications components of apparatus 300 can be used for communicating with other devices, including media servers and presentation devices. Wired communications circuitry 308 and wireless communications circuitry 310 each can be configured to permit apparatus 300 to transmit and receive information over a network, such as a local area network (LAN), the Internet, etc. Additionally, input circuitry 312 can be configured to receive an input from another device through a direct connection, which may be a wired/physical connection (e.g., USB, IEEE 1394, etc.) or wireless connection (e.g., infrared, etc.).

Other types of input interfaces, which are not shown in FIG. 3, may also be implemented in apparatus 300. For example, an input interface may use touch-based operations, near-contact operations, speech-based operations, operations based on tracking a user's eyes or physical presence, any other type of input, or an combination thereof. An input interface, such as a remote control for example, can utilize any type of sensor(s) to generate one or more input signals based on receiving, for example, physical stimuli (e.g., a touch event). In some embodiments, apparatus 300 can include or be coupled to a keyboard and/or one or more other suitable input components (e.g., mouse, trackball, stylus, touch screen, etc.), or any combination thereof. The input components and devices that can be used in conjunction with some embodiments of the present invention are represented in FIG. 3 by circuitry 312, which can be configured to convert any type of physical stimuli into corresponding electrical (digital and/or analog) signal(s). For example, multi-touch display screens and the corresponding circuitry are discussed in commonly assigned U.S. Patent Publication No. US 2006/0097991, entitled "MULTIPOINT TOUCHSCREEN," which was incorporated by reference above. One skilled in the art would appreciate that a plurality of input circuitry can be used in connection with the invention and that circuitry 312 is shown as being singular to avoid overcomplicating the drawing.

Apparatus 300 also can comprise output circuitry 314 that can be used to output data and/or information from apparatus 300 to one or more external devices, including, for example, a television, a monitor, an audio receiver, and/or one or more speakers. Output circuitry 314 can be, for example, one or more of an optical audio interface, an RCA connector interface, a component video interface, a High-Definition Multimedia Interface (HDMI), coaxial cable, or any other port(s) used to pass data from apparatus 300 to another device or component. In embodiments, output circuitry 314 can be used to provide a first type of signal, such as an audio stream, to a first device and another type of signal, such as a video stream, to a second device. Output circuitry 314 can also include driver circuitry of at least one integrated or other display screen or device, speaker, telephone ringer, vibration component, any other component or device, or any combination thereof. Like any other component discussed herein, output circuitry 314 may need to be configured, either automatically or manually, and/or require certain software/firmware before being used as discussed herein.

Apparatus 300 also can comprise memory 316, which can be, for example, random access memory (RAM), read only memory (ROM) and/or any other type of data storage device. As with storage 304, a plurality of types of data can be stored in memory 316, including the types of data discussed above as well as, for example, software that is implemented in apparatus 300. One skilled in the art would appreciate that various components of apparatus 300 can be combined or subdivided without departing from the spirit of the present invention. For example, a portion of storage 304 can be allocated to act as memory 316, which may or may not allow memory 316 to be omitted from apparatus 300.

Figure 4:
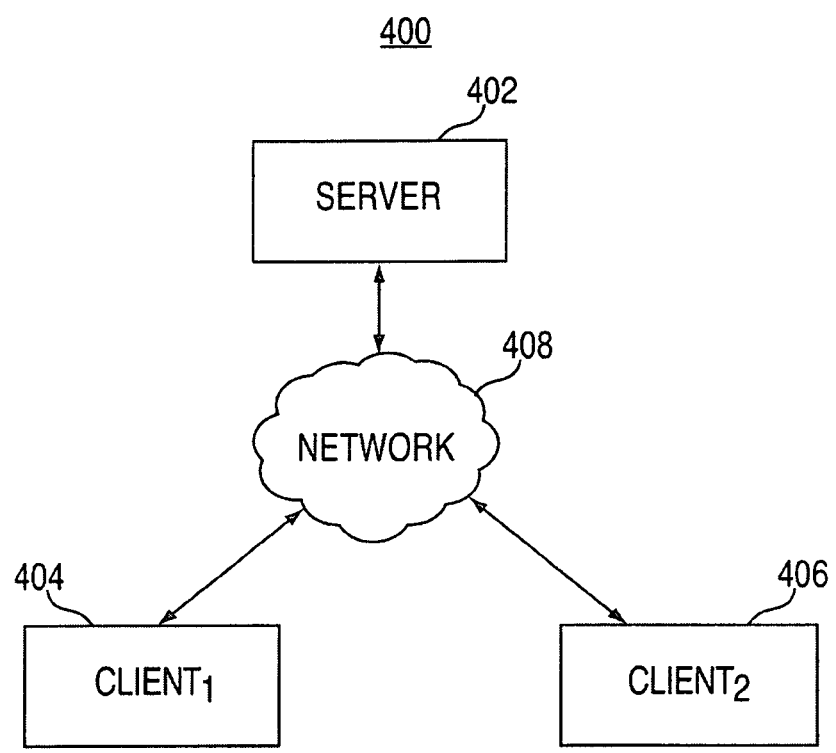
FIG. 4 shows a simplified system that includes an exemplary network of devices in accordance with embodiments of the present invention.

FIG. 4 shows system 400, which includes server 402, first client 404, second client 406 and network 408. Server 402, first client 404 and second client 406 can each be any electrical device that is or can be coupled to network 408 (either directly or indirectly). Server 402 can be, for example, an application server, a communications server, a database server, a proxy server, a file server, a game server, a standalone server, a web server, or any other type of electrical device that may serve information to a client device. In some embodiments, server 402 can act as a client as well.

First client 404 and/or second client 406 can be similar to or the same as device 102 (of FIG. 1) and/or device 202 (of FIG. 2). In some embodiments, one or more of first client 404 and second client 406 can function as a server as well.

Network 408 can be any type of network, such as for example, a client-server network or a peer-to-peer network (which occurs when devices can act as both clients and servers). Network 408 can comprise, for example, one or more wired connections (which includes all physical connections like, e.g., fiber optic connectors, etc.), wireless connections, or any combination thereof. For example, network 408 can include one or more LANS, wide area networks (WANs), telecommunication networks (such as those used with mobile telephones and land-line telephones), cable television distribution systems, satellite systems (including, but not limited to, global positioning networks, satellite television, etc.), and/ or any other interconnection of electrical devices. Other electrical devices (including other servers and clients) can also be coupled to network 408, but are not shown in FIG. 4 to avoid overcomplicating the drawing.

Although server 402, first client 404 and second client 406 can each operate as both a client and server (thereby allowing network 408 to be a peer-to-peer network), for simplicity, the present invention is discussed herein as server 402 acting as a server when communicating with first client 404 and second client 406. For purposes of illustration, network 408 is discussed herein as being a public network (e.g., the Internet), though one skilled in the art would understand that network 408 may be or include one or more private networks.

Server 402 can receive a request for data from first client 404 and/or second client 406 via network 408. The request can be generated by the client device in response to receiving an input from an input component and/or communications circuitry. The request can include one or more data signals, which include a format qualifier that can indicate to the server the types of data formats that a client device would like to receive in response to the request. For example, server 402 can be used to store and serve data to first client 404 and second client 406. Some of the data stored on server 402 can be encoded in a first format and some of the data can be encoded in a second format. First client 404 can, for example, play videos encoded in the first format, but not the second. The request first client 404 sends to server 402 can include a format qualifier that indicates first client 404 would like to receive videos encoded using the first format. This allows, among other things, different clients, which have different software implemented on them, to only receive data that each client is able to utilize. As such, when a client device has additional software loaded onto it, the client device may then start using additional format qualifiers. The present invention helps to, among other things, reduce erroneous network traffic, make more client processing power available (because processing bandwidth is not wasted receiving and displaying data that the device cannot utilize), and reduce user frustration (e.g., the user will not be presented with selections that the client device is unable to present to the user).

The format qualifier can be integrated into, for example, a URL that is or is part of the request for the data. In addition, multiple format qualifiers can be included in a single request. For example, a request may include the URL: http://gdata.youtube.com/fees/stadardfeeds/most_viewed!format=y,z. This, for example, indicates to the server that the client is requesting YouTube's most viewed videos that are encoded using the format that corresponds with the y,z format qualifier. The y,z format qualifier can indicate that the requesting client would like to receive, for example, all video data and/or metadata associated with videos that are formatted for playback using (in some instances software implemented on) Apple Inc.'s iPod™ (such as that shown in FIG. 1), iPhone™ (such as that shown in FIG. 2) and/or Apple TV™. Apple Inc. is headquartered in Cupertino, Calif. Different format qualifiers can correspond to pre-defined video encoding formats (such as, e.g., the H.264 video format).

Different client devices can be preprogrammed, hardwired or user configured to include various format identifiers in the data requests sent to all or particular servers. For example, certain format qualifiers can be included in requests sent to YouTube servers, but not other servers, like MAC servers, despite the same device generating and sending the requests.

A client device can also use different format qualifiers for different servers. For example, format qualifier y,z to YouTube servers could be equivalent to format qualifier a,b on .MAC servers and the client device could determine where the request is being sent and send the appropriate request to the associated server.

In response to receiving a request with a format qualifier, the server can return data associated with the format qualifier. For example, the server may only provide the client device metadata associated with the format qualifier. The client device can then use that metadata to generate media file listings. The media file listings (e.g., video listings, song listings, etc.) can be presented to the user by the client device. In this manner, only listings associated with programs that the user is able to view on the client device are provided to the user by the client device. The user can then select a media listing and, in response, the client device can request the associated media data from a server. That server may or may not be the same server that initially provided the metadata to the client device.

The format identifier can also be used in connection with requests for RSS XML feeds. RSS XML feeds can be used to provide the client device with metadata associated with media files, text data regarding news articles, etc.

One skilled in the art would appreciate other embodiments of the present invention. As such, this disclosure is meant to be illustrative and not limiting of various exemplary features that can be used in by the present invention.

What is claimed is:

1. A method of requesting information from a server, comprising:
   receiving, at a wireless mobile client device, a user input indicating a desire to view at least one video stored on the server, encoded in a plurality of formats;
   selecting, at the wireless mobile client device, a first format from the plurality of formats based on at least a format that the wireless mobile client device is able to use;
   in response to receiving the user input, determining, at the wireless mobile client device, a type of the server from a plurality of server types;
   in response to determining the type of the server and selecting the first format, generating, at the wireless mobile client device a URL request that includes an embedded format identifier that:
   is specific to the type of the server, and
   is associated with selected first format;
   providing, from the wireless mobile client device, the URL request to the server; and
   receiving, at the wireless mobile client device, data from the server.

2. The method of claim 1 further comprising:
   processing the data; generating information based on the data; displaying the information, wherein the information is associated with the at least one video that: is stored on the server, and is encoded in accordance with the selected first format.

3. The method of claim 1, wherein the receiving the data further comprises:
   receiving streaming video data that is encoded in accordance with the selected first format; and presenting the video data to a user.

4. The method of claim 1, wherein the generating the URL request further comprises:
   generating the format identifier associated with the selected first format of H.264 video.

5. A system of exchanging information among devices remotely located from each other, comprising:
   a network;
   a server coupled to the network; and
   a wireless mobile client device coupled to the network, comprising:
   an input component that receives a user input indicating a desire to view at least one video stored on the server, encoded in a plurality of formats;
   a processor that:
   selects a first format from the plurality of formats based on at least a format that the wireless mobile client device is able to use;
   in response to receiving the user input, determines a type of the server from a plurality of server types, and
   in response to determining the type of the server and selecting the first format, generates a URL request that includes an embedded format identifier that:
   is specific to the type of server, and is associated with the selected first format; and
   communications circuitry that:
   provides the URL request to the server over the network, and receives data from the server through the network, wherein the data is associated with the format identifier.

6. The system of claim 5, wherein the wireless mobile client device further comprises:
   an integrated display screen that presents a display to the user.

7. The system of claim 6 wherein: the processor is further configured to:
   process the data; and generate the display based on the data, wherein the display includes information associated with the at least one video that: is stored on the server, and is encoded in accordance with the selected first format.

8. The system of claim 5 wherein: the communications circuitry is further configured to receive streaming video; and the wireless mobile client device further comprises a display screen that presents the video to a user.

9. The system of claim 5 wherein: the selected first format is H.264 video.

10. A wireless mobile client device coupled to a network for exchanging information, the wireless mobile client device comprising:
    an input component that receives a user input indicating a desire to view at least one video stored on a server, encoded in a plurality of formats;
    a processor that:
    selects a first format from the plurality of formats based on at least a format that the wireless mobile client device is able to use;
    in response to receiving the user input, determines a type of the server from a plurality of server types, and
    in response to determining the type of server and selecting the first format, generates a URL request that includes an embedded format identifier that:
    is specific to the type of server, and
    is associated with the selected first format; and
    communications circuitry that:
    provides the URL request to the server over the network, and receives data from the server through the network, wherein the data is associated with the format identifier.

* * * * *